United States Patent
Tiwari et al.

(10) Patent No.: US 10,633,556 B2
(45) Date of Patent: Apr. 28, 2020

(54) METHOD OF PRODUCING AMBIENT CURING SPRAYABLE TRANSPARENT SMART QUASI-CERAMIC COATING

(71) Applicant: FLORA COATINGS LLC

(72) Inventors: Atul Tiwari, Phoenix, AZ (US); Anupama Chaturvedi, Phoenix, AZ (US)

(73) Assignee: FLORA COATINGS LLC, PH, AZ (US)

(*) Notice: Subject to any disclaimer, the term of this patent is extended or adjusted under 35 U.S.C. 154(b) by 81 days.

(21) Appl. No.: 15/857,568

(22) Filed: Dec. 28, 2017

(65) Prior Publication Data
US 2019/0203072 A1 Jul. 4, 2019

(51) Int. Cl.
| | | |
|---|---|---|
| *C09D 185/00* | (2006.01) | |
| *C09D 183/16* | (2006.01) | |
| *C09D 183/14* | (2006.01) | |
| *C08G 79/00* | (2006.01) | |
| *C08G 79/10* | (2006.01) | |
| *C08G 77/58* | (2006.01) | |
| *C08K 3/34* | (2006.01) | |
| *C08K 3/36* | (2006.01) | |
| *C08K 3/22* | (2006.01) | |

(52) U.S. Cl.
CPC .......... *C09D 185/00* (2013.01); *C08G 79/00* (2013.01); *C08G 79/10* (2013.01); *C09D 183/14* (2013.01); *C09D 183/16* (2013.01); *C08G 77/58* (2013.01); *C08K 3/34* (2013.01); *C08K 3/36* (2013.01); *C08K 2003/2227* (2013.01); *C08K 2201/011* (2013.01)

(58) Field of Classification Search
CPC ...... C09D 185/00; C08G 79/00; C08G 79/10; C08K 3/34; C08K 3/36; C08K 2003/2227; C08K 2201/011
USPC .......................................................... 524/424
See application file for complete search history.

(56) References Cited

U.S. PATENT DOCUMENTS

| | | |
|---|---|---|
| 9,006,370 B1 | 4/2015 | Liu et al. |
| 2001/0056141 A1 | 12/2001 | Schutt |
| 2006/0142471 A1 | 6/2006 | Shindo |
| 2018/0086919 A1* | 3/2018 | Gantillon ............ C09D 179/08 |

FOREIGN PATENT DOCUMENTS

EP    2535385 A2    12/2012

OTHER PUBLICATIONS

European Patent Application No. 18248209.1, Extended European Search Report, dated Apr. 12, 2019.

* cited by examiner

*Primary Examiner* — Hui H Chin
(74) *Attorney, Agent, or Firm* — Marshall, Gerstein & Borun LLP

(57) ABSTRACT

A liquid silicone-based composition for forming a coating, the composition comprising a silazane, an organometallic compound, an alkoxysilane, and an aprotic solvent, wherein when applied to a substrate the liquid composition cures to form a quasi-ceramic coating under ambient conditions.

24 Claims, 1 Drawing Sheet

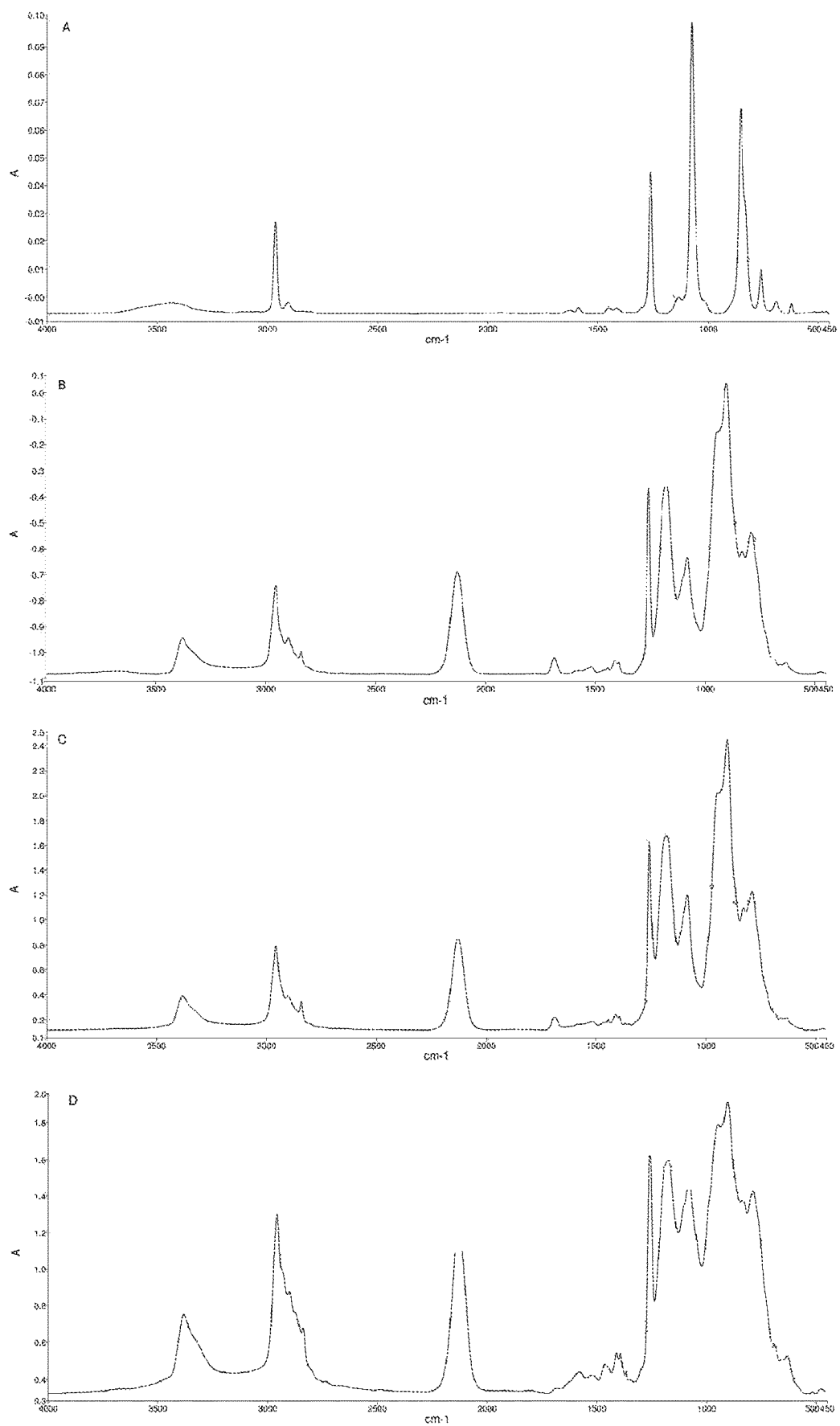

METHOD OF PRODUCING AMBIENT CURING SPRAYABLE TRANSPARENT SMART QUASI-CERAMIC COATING

STATEMENT OF GOVERNMENT INTEREST

This invention was made with government support under grant number 1721411 awarded by the National Science Foundation. The government has certain rights in the invention.

FIELD OF THE DISCLOSURE

The disclosure relates generally to silicone-based coatings and methods of making and using same. In particular, the disclosure relates to an ambient curing, sprayable, silicone-based material for preparing transparent quasi-ceramic coatings.

BACKGROUND

The protection of surfaces can be achieved through coatings that can adhere to the surface and act as a dense barrier against aggressive conditions. Typical protective coatings include silicone-based materials which, when cured, provide a dense ceramic coating. Silicone coatings tend to condense rapidly without leaving organic functionalities for the adhesion of any foreign polymer material. Accordingly, topcoating over silicone coatings is extremely difficult. Additionally, current commercially available silicone-based coating compositions include several components which are packaged individually and must be mixed in appropriate ratios just prior to the application, and cured at elevated temperatures once applied. After mixing the individual components, the individual components being reacting and transforming into a solid product. thus, the mixed composition must be used quickly, and leftover or unused material becomes useless solid waste product. Further, while some conventional silicon based coating compositions may allow for curing under ambient conditions, they must further include an appropriate catalyst.

SUMMARY

Disclosed herein is a silicone-based coating composition having one or more advantageous properties, for example, coating compositions that can be provided as a single component (i.e., does not require mixing individual components by the consumer prior to use), coating compositions demonstrating auto-catalytic curing selectively in presence of air and moisture provided by ambient conditions (i.e., do not require application of heat by the consumer), and/or coating compositions having surface properties which allows (or prevents) adhesion of a foreign material, such as paint.

One aspect of the disclosure provides a coating comprising a solid matrix of a silicone-based material having a backbone structure according to formula (I):

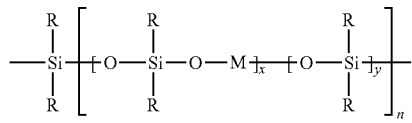

wherein n is a segment and in each segment M is a metal independently selected from Zr, Ta, Ag, W, Al, Ti, or combinations thereof; x is one or more metallosiloxane fragments; and y is one or more siloxane fragments; wherein the solid matrix comprises a plurality of segments n; and R is independently selected from hydrogen, $C_1$-$C_{30}$ alkyl, $C_1$-$C_{30}$ fluoroalkyl, $C_1$-$C_{30}$ alkyl amine, $C_1$-$C_{30}$ dialkyl amine, $C_1$-$C_{30}$ trialkyl amine, $C_1$-$C_{30}$ tetraalkyl ammonium, $C_1$-$C_{10}$ alkoxide, or a backbone oxygen of a second segment n.

Another aspect of the disclosure provides a liquid silicone-based composition for forming a coating, the composition comprising a silazane, an organometallic compound, an alkoxysilane, and an aprotic solvent, wherein when applied to a substrate the liquid composition cures to form a quasi-ceramic coating under ambient conditions.

Another aspect of the disclosure provides a method of preparing a liquid silicone-based composition, comprising admixing in a solvent a silazane and an organometallic compound, thereby providing a first solution; and admixing the first solution with an alkoxysilane, thereby providing a liquid silicone-based composition, wherein the solvent comprises an aprotic solvent.

A further aspect of the disclosure provides a method of coating a substrate, comprising depositing on said substrate the liquid silicone-based coating composition of the disclosure.

Further aspects and advantages will be apparent to those of ordinary skill in the art from a review of the following detailed descriptions. While the compositions and methods are susceptible of embodiments in various forms, the description hereafter includes specific embodiments with the understanding that the disclosure is illustrative and is not intended to limit the invention to the specific embodiments described herein.

BRIEF DESCRIPTION OF THE DRAWINGS

For further facilitating the understanding of the disclosure, one drawing FIGURE is attached hereto.

FIG. 1 shows the FTIR spectrum of A) hexamethyldisiloxane, B) the composition of Example 1, C) the composition of Example 2, and D) the composition of Example 3.

DETAILED DESCRIPTION

Provided herein is a liquid silicone-based composition for forming a coating, the composition comprising a silazane, an organometallic compound, an alkoxysilane, and an aprotic solvent, wherein when applied to a substrate the liquid composition cures to form a quasi-ceramic coating under ambient conditions, coatings comprising same, and methods of making and using same. The composition can optionally further include an organic filler, an inorganic filler, a silsesquioxane, or combinations thereof.

As used herein and unless specified otherwise, "quasi-ceramic coating" refers to a coating containing trace amounts of unreacted or uncured organic molecules. The three dimensional structure of a quasi-ceramic material is similar to a ceramic material, but less dense.

Silazane

The silazane is not particularly limited and can be in the form of a monomer, compound, oligomer, polymer, or combination thereof. In embodiments, the silazane comprises an organopolysilazane. In embodiments, the organopolysilazane has a molecular weight in a range of about 160 g/mol to about 200,000 g/mol, about 200 g/mol to about 175,000 g/mol, about 500 g/mol to about 150,000 g/mol, about 160 g/mol to about 100,000 g/mol, or about 50,000 g/mol to about 200,000 g/mol. Suitable organopolysilazanes include, but are not limited to, hexamethyl disilazane, alkoxy polysilazane, vinylpolysilazane, or combinations thereof.

Organometallic Compound

The presence of the organometallic compound allows for the formation of metallosiloxane fragments in the backbone matrix of the coating composition. Without intending to be bound by theory, it is believed that the presence of metallosiloxanes in the backbone of the matrix facilitates auto-catalytic curing of the liquid siloxane-based coating composition under ambient conditions.

The metal of the organometallic compound can be selected from the group consisting of transition metals, p-block metals, lanthanides, and combinations thereof. In embodiments, the metal of the organometallic compound comprises a transition metal. In embodiments, the metal of the organometallic compound comprises Zr, Ta, Ag, W, Al, Ti, Cu, Ce, La or combinations thereof. In embodiments, the metal of the organometallic compound comprises Zr and Ta. In embodiments, the metal of the organometallic compound comprises Zr, Ta, Ag, or combinations thereof. Non-metal elements can be used in place of or in addition to the metal of the organometallic compound, provided that the non-metal can facilitate auto-catalytic curing of the liquid siloxane-based coating composition. Suitable non-metal elements include, but are not limited to P and Br.

The organometallic compound can comprise a metal $C_1$-$C_{10}$ alkoxide. As used herein, "alkoxide" refers to the conjugate base of an alkyl alcohol, wherein "alkyl" refers to straight chained and branched saturated hydrocarbon groups containing one to thirty carbon atoms, for example, one to twenty carbon atoms, or one to ten carbon atoms. The alkyl group can be substituted, for example, with an amino group, hydroxy group, thio group, alkoxy group, halogens, or combinations thereof. The term $C_n$ means the alkyl group has "n" carbon atoms. For example, $C_4$ alkyl refers to an alkyl group that has 4 carbon atoms and $C_4$ alkoxide refers to the conjugate base of butanol (including n-butanol, t-butanol, and s-butanol). $C_1$-$C_7$ alkyl refers to an alkyl group having a number of carbon atoms encompassing the entire range (i.e., 1 to 7 carbon atoms), as well as all subgroups and species falling there within (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl.

In embodiments, the organometallic compound comprises zirconium tert-butoxide, tantalum ethoxide, silver neodecanoate, titanium butoxide, tungsten ethoxide, aluminum tri-sec-butoxide or combinations thereof.

Alkoxysilane

The alkoxysilane can be in the form of a monomer, a compound, an oligomer, a polymer, or combinations thereof. In embodiments, the alkoxysilane comprises a $C_1$-$C_{10}$ alkoxide, $C_1$-$C_{10}$ alkoxide, $C_1$-$C_9$ alkoxide, $C_1$-$C_8$ alkoxide, $C_1$-$C_7$ alkoxide, $C_1$-$C_6$ alkoxide, $C_1$-$C_5$ alkoxide, $C_1$-$C_4$ alkoxide, or $C_1$-$C_3$ alkoxide. In embodiments, the alkoxysilane comprises a $C_1$-$C_{30}$ alkyl, a $C_1$-$C_{30}$ fluoroalkyl, a $C_1$-$C_{30}$ alkyl amine, a $C_1$-$C_{30}$ dialkyl amine, a $C_1$-$C_{30}$ trialkyl amine, a $C_1$-$C_{30}$ tetraalkyl ammonium, or combinations thereof. In embodiments, the alkoxysilane comprises 3-aminopropyltrimethoxysilane, glycodioxypropyltrimethoxysilane, 1H,1H,2H,2H-perfluorooctyltriethoxysilane, 1H,1H,2H,2H-perfluorodecyltrimethoxysilane, 1H,1H,2H,2H-perfluorodecyltriethoxysilane, octadecyldimethyl (3-trimethoxy silylpropyl) ammonium chloride, N-(2-aminoethyl)3-aminopropyl-trimethoxysilane, N-(2-aminoethyl)3-aminopropyl-triethoxysilane, or combinations thereof.

In embodiments, the alkoxysilane can be selected to provide additional functionality to the final dried, cured, coating. For example, the amino groups of N-(2-aminoethyl) 3-aminopropyl-trimethoxysilane and N-(2-aminoethyl)3-aminopropyl-triethoxysilane can provide adhesion promoting properties to the coating.

Solvent

Organosilanes are hydrolytically unstable and can condense in the presence of trace amount of metals and moisture. Thus, an aprotic solvents is selected to provide a single component, ready to use, liquid silicone-based coating compositions. The presence of water or other solvents capable of hydrogen bonding in the liquid composition can result in premature condensation of the liquid silicone-based coating composition. Suitable aprotic solvents include, but are not limited to, hexamethyldisiloxane, octamethyltrisiloxane, octamethylcyclotetrasiloxane, decamethyltetrasiloxane, decamethylcyclopentasiloxane, dodecamethylpentasiloxane, dodecamethylcyclohexasiloxane, tetradecamethylhexasiloxane, or combinations thereof t-butyl acetate, n-butyl acetate, ethyl acetate, xylene, petroleum benzene, dipropylene glycol dimethyl ether, dipropylene glycol dibutyl ether, 1-methoxy-2-propyl acetate, 2-butoxyethyl acetate, 2-(2-butoxyethoxy) ethyl acetate, naphtha, dibutylether (DBE), or combinations thereof. In some embodiments, the solvent comprises a siloxane. In some embodiments, the solvent comprises hexamethyldisiloxane. In some embodiments, the solvent comprises an acetate. In some embodiments, the solvent comprises the combination of a siloxane and an acetate. In some embodiments, the solvent comprises DBE. In some embodiments, the solvent comprises a siloxane, an acetate, DBE, or a combination thereof. In some embodiments, the solvent comprises hexamethyldisiloxane, t-butyl acetate, dibutylether, or combinations thereof. In some embodiments, the solvent comprises at least two aprotic solvents. In some embodiments, the solvent comprises at least three aprotic solvents. When two or more aprotic solvents are used in combination, the aprotic solvents can be miscible.

The liquid silicone-based composition can be a homogenous solution or a suspension. In embodiments, the liquid silicone-based composition is a homogenous solution. In embodiments, the liquid silicon-based composition is a suspension. The viscosity of the liquid silicone-based composition is not particularly limited. The viscosity of the liquid silicone-based composition can be selected to be suitable for the application/deposition technique. For example, when the liquid composition is to be deposited on a substrate by spraying the liquid composition, the viscosity can be in a range of 0.1 to 50 MPa, 0.1 to 25 MPa, 0.1 to 20 MPa, 5 to 50 MPa, 10 to 50 MPa, or 20 to 50 MPa. As a further example, when the liquid composition is to be deposited on a substrate by painting the liquid composition, the viscosity of the composition can be higher than that of the sprayed composition, for example, in a range of 0.1 to 50 MPa, 0.1 to 40 MPa, 0.1 to 30 MPa, 5 to 50 MPa, 10 to 50 MPa, 15 to 50 MPa, or 20 to 50 MPa. In embodiments, the viscosity and the flow characteristics of the liquid silicone-based composition are similar to the viscosity and flow characteristics of water.

The liquid siloxane-based composition can further comprise one or more optional ingredients including, but not limited to, an organic filler, and inorganic filler, a silsesquioxane, or combinations thereof. Suitable organic fillers include, but are not limited to, organofunctionalized silica or organofunctionalized clay. Suitable inorganic fillers include, but are not limited to, fused silica nanoparticles, aluminum oxide nanoparticles, silicon carbide nanoparticles, silicon nitride nanoparticles, copper nanoparticles, or combinations thereof.

The optional organic filler and inorganic filler can be any suitable material for providing additional properties to the final dried coating, including, for example, enhanced scratch resistance, enhanced toughness, and/or a matte finished surface. The filler can be suspended in the liquid siloxane-based composition. After application of the composition to a substrate, the filler does not chemically attach to the backbone matrix, but is encapsulated in the solid three-dimensional coating matrix.

A silsesquioxane can be included to provide additional functionalized silanes into the backbone matrix of the silicone-based coating and to provide additional properties to the final dried coating, including, for example, enhanced toughness, enhanced hardness, and/or scratch resistance. The silsesquioxane can be provided in the form of a monomer, compound, oligomer, polymer, or combinations thereof. In embodiments, the silsesquioxane comprises polyhedral oligomeric silsesquioxane. In embodiments, the silsesquioxane has a general formula: $(RSiO_{1.5})_n$, wherein R can be hydrogen, alkyl, aryl, or alkoxy and n is from 4 to 16, 6 to 12, or 8 to 10, for example.

In embodiments, the liquid silicone-based composition comprises organopolysilazane, zirconium tert-butoxide, tantalum ethoxide, glycodioxypropyltrimethoxysilane, hexamethyldisiloxane, and optionally t-butyl acetate and/or dibutylether. In embodiments, the liquid silicone-based composition comprises organopolysilazane, zirconium tert-butoxide, tantalum ethoxide, glycodioxypropyltrimethyoxysilane, hexamethyldisiloxane, t-butyl acetate and dibutylether.

Method of Preparing Liquid Composition

The method of preparing a liquid silicone-based composition for use in providing a silicone-based coating, includes admixing in an aprotic solvent a silazane and an organometallic compound, thereby providing a first solution; and admixing the first solution with an alkoxysilane, thereby providing a liquid silicone-based composition.

The admixing of the solvent, silazane and organometallic compound to provide the first solution can be performed under the flow of an inert gas, such as nitrogen, to prevent water vapor from entering the composition and initiating condensation of the silazane and later-added alkoxysilanes. The silazane can first be dissolved in the solvent, followed by addition of the organometallic compound or compounds as aprotic solutions to the silazane solution. In embodiments, the composition comprises a second organometallic compound. When more than one organometallic compound is used, the organometallic compounds can be added simultaneously or step-wise. The solvent in which the silazane is dissolved can be the same or different from the solvent in which the organometallic compound or compounds are dissolved, provided that all of the solvents are aprotic.

After addition of the silazane to the solvent, the solution can be stirred for a time sufficient to form a homogeneous solution. The solution can be stirred, for example, for 10 min., for 20 min, for 30 min, or for 45 min. The addition of the silazane and the stirring can be performed at ambient temperatures (e.g., 23° C.+/−3° C. (73° F.+/−5° F.)).

The organometallic compound(s) can be stirred in a solvent for a time sufficient to form a homogeneous solution, for example, for 10 min., for 20 min., for 30 min, or for 45 min. The addition of the silazane and the stirring can be performed at ambient temperatures (e.g., 23° C.+/−3° C. (73° F.+/−5° F.)).

The addition of the organometallic compound solution(s) to the silazane solution can be performed at ambient temperatures (e.g., 23° C.+/−3° C. (73° F.+/−5° F.)). The resulting first solution can be stirred for a time sufficient to form a homogeneous solution, for example, for 10 min., for 20 min., for 30 min, or for 45 min. Without intending to be bound by theory, it is believed that some intermolecular hydrogen bonding takes place in solution to stabilize the first solution and allow the components of the first solution to remain solubilized.

The admixing of the first solution with the alkoxysilane can be performed under the flow of an inert gas, such as nitrogen, at ambient temperatures (e.g., 23° C.+/−3° C. (73° F.+/−5° F.)). The alkoxysilane can be dissolved in an aprotic solvent that is the same or different from the solvent in which the silazane and organometallic compound are dissolved. The resulting liquid silicone-based composition can be stirred for a time sufficient to form a homogeneous solution, for example, for 10 min., for 20 min., for 30 min, or for 45 min. Without intending to be bound by theory, it is believed that some intermolecular hydrogen bonding takes place in solution to stabilize the liquid silicone-based composition and allow the components of the first solution to remain solubilized.

Advantageously, it has been found that when the order of addition of components is as described above, a stable solution forms. For example, when the organometallic compounds or alkoxysilane were added prior to addition of the silazane, the reaction medium becomes cloudy. Without intending to be bound by theory, it is believed that when the reaction medium becomes cloudy it is due to the precipitation of a material from the reaction medium as a result of chemical reaction between the components.

In embodiments, the method further comprises admixing with the liquid silicone-based composition a solution of a second alkoxysilane. The addition of a second alkoxysilane can be performed under a flow of inert gas, such as nitrogen, at ambient temperatures (e.g., 23° C.+/−3° C. (73° F.+/−5° F.)). The second alkoxysilane can be dissolved in an aprotic solvent. The liquid silicone-based composition including the second alkoxysilane can be stirred for a time sufficient to form a homogeneous solution, for example, for 10 min., for 20 min., for 30 min, or for 45 min. The second alkoxysilane can be added in an amount in the range of about 1 wt. % to about 10 wt. %, based on the weight of the liquid silicone-based composition. Without intending to be bound by theory, it is believed that as the amount of second alkoxysilane decreases below 1 wt. % no significant effect on the surface properties of the coating is demonstrated and when the amount of second alkoxysilane increases about 10 wt. %, the resulting silicone-based composition does not provide a useful coating material.

The second alkoxysilane can be in the form of a monomer, a compound, an oligomer, a polymer, or combinations thereof. In embodiments, the second alkoxysilane comprises a $C_1$-$C_{10}$ alkoxide, $C_1$-$C_{10}$ alkoxide, $C_1$-$C_9$ alkoxide, $C_1$-$C_8$ alkoxide, $C_1$-$C_7$ alkoxide, $C_1$-$C_6$ alkoxide, $C_1$-$C_5$ alkoxide, $C_1$-$C_4$ alkoxide, or $C_1$-$C_3$ alkoxide. In embodiments, the second alkoxysilane comprises a $C_1$-$C_{30}$ alkyl, a $C_1$-$C_{30}$ fluoroalkyl, a $C_1$-$C_{30}$ alkyl amine, a $C_1$-$C_{30}$ dialkyl amine, a $C_1$-$C_{30}$ trialkyl amine, a $C_1$-$C_{30}$ tetraalkyl ammonium, or combinations thereof. In embodiments, the second alkoxysilane comprises 3-aminopropyltrimethoxysilane, glycodioxypropyltrimethoxysilane, 1H,1H,2H,2H-perfluorooctyl-triethoxysilane, 1H,1H,2H,2H-perfluorodecyltrimethoxysilane, 1H,1H,2H,2H-perfluorodecyltriethoxysilane, octadecyldimethyl (3-trimethoxy silylpropyl) ammonium chloride, N-(2-aminoethyl)3-aminopropyl-trimethoxysilane, N-(2-aminoethyl)3-aminopropyl-triethoxysilane, or combinations thereof.

The method can further include admixing with the liquid silicone-based composition an organic filler, an inorganic filler, a silsesquioxane, or combinations thereof. The organic filler, inorganic filler, and/or silsesquioxane can be added as a solution or suspension in an aprotic solvent, under a flow of inert gas, such as nitrogen, at ambient temperatures (e.g., 23° C.+/−3° C. (73° F.+/−5° F.)). The resulting liquid silicone-based composition comprising an organic filler, an inorganic filler, and/or a silsesquioxane can be stirred for a time sufficient to form a homogeneous solution (or suspension), for 10 min., for 20 min., for 30 min, or for 45 min. The filler may not be soluble in the aprotic solvent and, therefore, will result in a liquid silicone-based composition having filler suspended therein. Without intending to be bound by theory, it is believed that upon application of the liquid silicone-based composition, any filler suspended therein will become entrapped in a solid three dimensional silicone-based matrix. The organic filler, inorganic filler, or silsesquioxane can be added in an amount in the range of about 1 wt. % to about 10 wt. %, based on the weight of the liquid silicone-based composition. Without intending to be bound by theory, it is believed that as the amount of additive decreases below 1 wt. % no significant effect on the surface properties of the coating is demonstrated and when the amount of additive increases about 10 wt. %, the resulting silicone-based composition does not provide a useful coating material.

Coating

Once cured, the liquid silicone-based composition forms a coating. The coating of the disclosure can comprise a solid matrix of a silicone-based material having a backbone structure according to formula (I),

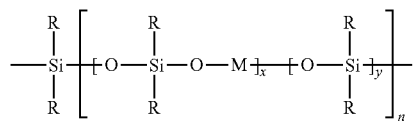

wherein n is a segment and in each segment M is a metal independently selected from Zr, Ta, Ag, W, Al, Ti; or combinations thereof, x is one or more metallosiloxane fragments; and y is one or more siloxane fragments; wherein the solid matrix comprises a plurality of segments n; and R is independently selected from hydrogen, $C_1$-$C_{30}$ alkyl, $C_1$-$C_{30}$ fluoroalkyl, $C_1$-$C_{30}$ alkyl amine, $C_1$-$C_{30}$ dialkyl amine, $C_1$-$C_{30}$ trialkyl amine, $C_1$-$C_{30}$ tetraalkyl ammonium, $C_1$-$C_{10}$ alkoxide, or a backbone oxygen of a second segment n. The M in each segment can be the same or different.

The number of segments n is not particularly limited. Upon curing of the liquid siloxane-based composition, a matrix comprising a backbone of metallosiloxane fragments and siloxane fragments form. The distribution of metallosiloxane fragments and siloxane fragments can be random. Without intending to be bound by theory, it is believed that the metallosiloxane fragments and siloxane fragments can crosslink two or more separate n segments and/or can form an intra-crosslinkage within one segment n (i.e., forming a ring structure within the backbone).

The selection of the R group can be used to control the surface properties of the cured coatings to allow, for example, the adhesion of another paint, and/or allow adhesion or prevent the adhesion of any foreign material to the coating surface. For example, as the amount of fluorinated R groups increases, the coating will become more "slippery" or non-wetable due to the high electronegativity of fluorine. As a further example, R groups with organic functionalities can be included to allow materials such as paint to adhere to the surface.

In embodiments, at least one R comprises a $C_1$-$C_{30}$ alkyl, a $C_1$-$C_{20}$ alkyl, a $C_1$-$C_{10}$ alkyl and/or a $C_1$-$C_5$ alkyl. In embodiments, at least one R comprises a $C_1$-$C_{30}$ fluoroalkyl, a $C_1$-$C_{20}$ fluoroalkyl, a $C_1$-$C_{10}$ fluoroalkyl and/or a $C_1$-$C_5$ fluoroalkyl. In some embodiments, R comprises a mixture of fluoroalkyls. In embodiments, at least one R comprises a $C_1$-$C_{30}$ alkyl amine, a $C_1$-$C_{20}$ alkyl amine, a $C_1$-$C_{10}$ alkyl amine and/or a $C_1$-$C_5$ alkyl amine. In embodiments, at least one R comprises a $C_1$-$C_{30}$ dialkyl amine, a $C_1$-$C_{20}$ dialkyl amine, a $C_1$-$C_{10}$ dialkyl amine and/or a $C_1$-$C_5$ dialkyl amine. In embodiments, at least one R comprises a $C_1$-$C_{30}$ trialkyl amine, a $C_1$-$C_{20}$ trialkyl amine, a $C_1$-$C_{10}$ trialkyl amine and/or a $C_1$-$C_5$ trialkyl amine. In embodiments, at least one R comprises a $C_1$-$C_{30}$ tetraalkyl ammonium, a $C_1$-$C_{20}$ tetraalkyl ammonium, a $C_1$-$C_{10}$ tetraalkyl ammonium and/or a $C_1$-$C_5$ tetraalkyl ammonium. In embodiments, at least one R comprises a $C_1$-$C_{10}$ alkoxide. In embodiments, 5 mol % or less, 3 mol % or less, or 1 mol % or less of the R groups comprise hydrogen.

In embodiments, the backbone structure consists of siloxane and metallosiloxane units. In embodiments, substantially all of the R groups are a backbone oxygen of a second segment n or a backbone oxygen of the segment n. As used herein, and unless specified otherwise, "substantially all of the R groups" refers to 85 mol % or more of the total R groups, 90 mol % or more of the total R groups, 95 mol % or more of the total R groups, 97 mol % or more of the total R groups, or 99 mol % or more of the total R groups. Without intending to be bound by theory, it is believed that after application of the liquid silicone-based composition to a substrate, the composition will self-cure under ambient conditions to provide a quasi-ceramic coating. Further without intending to be bound by theory, it is believed that over an extended amount of time (e.g., months to years), or in the presence of heat, labile R groups will be replaced and crosslinking occur until substantially all of the R groups are a backbone oxygen of a second segment n or a backbone oxygen of the segment n. As used herein, and unless specified otherwise, "ambient conditions" refers to a temperature of about 23° C.+/−3° C. (73° F.+/−5° F.), and 50% relative humidity (RH)+/−10% RH.

The backbone can further comprise metallosiloxane units comprising transition metals, p-block metals, and lanthanides. In embodiments, the backbone can comprise metallosiloxane units comprising Cu, Ce, La, or combinations thereof. Non-metal elements can be used in place of, or in addition to, the metal of the metallosiloxane, provided that the non-metal can facilitate auto-catalytic curing of the liquid siloxane-based coating composition. Suitable non-metal elements include, but are not limited to P and Br. Thus, in some embodiments, the backbone further comprises phosphorosiloxane, bromosiloxane units, or combinations thereof.

The coating can further comprise organic fillers and/or inorganic fillers. In embodiments the filler comprises fused silica nanoparticles, aluminum oxide nanoparticles, silicon carbide nanoparticles, silicon nitride nanoparticles, copper nanoparticles, or combinations thereof. Without intending to be bound by theory, it is believed that the fillers are not chemically attached to the backbone structure but are encapsulated in the three dimensional structure of the backbone matrix.

The coating can have any thickness sufficient for protecting the substrate from aggressive conditions (e.g., extreme heat). The coating can have a thickness of at least 5 nm, at least 10 nm, at least 15 nm, at least 20 nm, at least 25 nm, or at least 30 nm, and/or up to about 50 micron, up to about 45 micron, up to about 40 micron, up to about 35 micron, up to about 30 micron, or up to about 25 micron. Without intending to be bound by theory, it is believed that when the coating is less than 5 nm, the substrate is not sufficiently covered so as to be protected from aggressive conditions. Further, without intending to be bound by theory, it is believed that any additional protection offered by increasing the thickness above 50 micron is negligible relative to the protection offered by a coating having a thickness of 50 micron.

Method of Coating

Further provided herein is a method of coating a substrate, comprising depositing on said substrate the liquid silicone-based composition of the disclosure.

The substrate on which the coating composition is deposited is not particularly limiting. Suitable substrates can include, but are not limited to, inorganic oxides (e.g., silicas, materials conventionally known as glass), ceramics, metals including metal oxides, semiconductors, wood, concrete, rocks, rubbers, paper, and/or polymeric substrates. Metal substrates can include, but are not limited to, stainless steel, cobalt, titanium, nickel, zirconium, tantalum, chromium, tungsten, molybdenum, manganese, iron, vanadium, niobium, hafnium, aluminum, tin, palladium, ruthenium, iridium, rhodium, gold, silver, platinum, oxides of the foregoing, alloys of the foregoing, and combinations of the foregoing. Suitable polymer substrates can include, but are not limited to, acrylonitrile butadiene styrenes, polyacrylonitriles, polyamides, polycarbonates, polyesters, polyetherketones, polyetherimides, polyethylenes, polyethylene terephthalates, polylactic acids, polymethyl methacrylates, polypropylenes, polystyrenes, polyurethanes, polyvinyl chloride, polyvinylidene chlorides, polyethers, polysulfones, silicones, polydimethylsiloxanes, polytetrafluoroethylene, polyisoprenes, and blends and copolymers thereof.

The liquid silicone-based composition can be deposited on the substrate using any known technique. For example, the substrate can be completely immersed in the liquid silicone-based composition by dip coating. Alternatively the liquid silicone-based composition can be sprayed or cast onto the substrate, for example, by spin casting or spraying a solution or suspension such as an aerosolized solution or aerosolized suspension. For substrates having an interior lumen, the liquid silicone-based composition can be flowed into the lumen to coat the interior thereof. Additionally, the liquid silicone-based composition can be deposited on the substrate by brushing, rolling, and/or wiping with a cloth wetted with the liquid silicone-based composition.

The liquid silicone-based composition can be deposited in any suitable thickness to provide a dried, solid, coating thick enough to protect the substrate from extreme or aggressive conditions. The thickness of the coating can be in a range of about 5 nm to about 50 micron.

The method can further comprise drying and/or curing the liquid silicone-based composition. In embodiments, the drying and/or curing is done under ambient conditions. The time of drying under ambient conditions can be less than 1 hour, less than 45 min., less than 30 min., and greater than 5 min., greater than 10 min., or greater than 15 min., for example, 25 min. Under ambient conditions, the time to fully cure can be about 5 to about 10 days, or about 6 to about 8 days, or about 7 days. A coating is considered fully cured when there is no deflection in the hardness and scratch test values over a 24 hour period. The coating can be layered with a second polymer (e.g., paint) within the curing window.

In embodiments, the applied liquid silicone-based coating can be heat treated for accelerated drying and/or curing. Suitable temperatures for drying and/or curing can be at least 30° C., at least 40° C., at least 50° C., at least 60° C., at least 70° C., at least 80° C., at least 90° C., or at least 100° C. and up to 400° C., up to 350° C., up to 300° C., up to 250° C., up to 200° C., or up to 150° C.

Without intending to be bound by theory, it is believed that in the presence of the metals from the organometallic compounds, the silicon bonds of the silazane, alkoxysilane, and optional silsesquioxane undergo reaction with water vapor in the air. Further, without intending to be bound by theory, it is believed that the condensation of the silicon bonds with water proceed as generically described in the following equations:

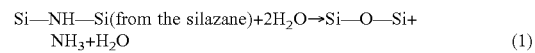

$$Si-NH-Si(\text{from the silazane}) + 2H_2O \rightarrow Si-O-Si + NH_3 + H_2O \quad (1)$$

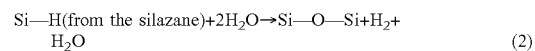

$$Si-H(\text{from the silazane}) + 2H_2O \rightarrow Si-O-Si + H_2 + H_2O \quad (2)$$

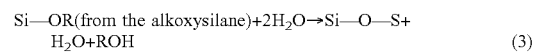

$$Si-OR(\text{from the alkoxysilane}) + 2H_2O \rightarrow Si-O-S + H_2O + ROH \quad (3)$$

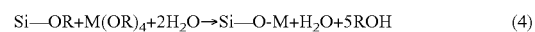

$$Si-OR + M(OR)_4 + 2H_2O \rightarrow Si-O-M + H_2O + 5ROH \quad (4)$$

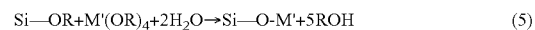

$$Si-OR + M'(OR)_4 + 2H_2O \rightarrow Si-O-M' + 5ROH \quad (5)$$

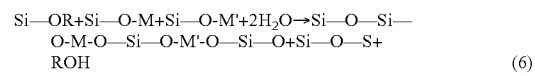

$$Si-OR + Si-O-M + Si-O-M' + 2H_2O \rightarrow Si-O-Si-O-M-O-Si-O-M'-O-Si-O + Si-O-S + ROH \quad (6)$$

The product of reaction 6 provides the backbone structure, wherein each Si can include a pendant R group or may be crosslinked through an oxygen to a second backbone chain. As the condensation reactions progress from a single composition, the distribution of M and M' is expected to be random throughout the backbone matrix. Accordingly, it is expected that there is a random distribution of metallosiloxane fragments and siloxane fragments provided throughout the backbone matrix structure.

The above described aspects and embodiments can be better understood in light of the following examples, which are merely intended to be illustrative and are not meant to limit the scope in any way.

EXAMPLES

Example 1

A three-necked round bottom flask (vessel A) was fitted with a magnetic stirrer and charged with flowing inert gas. 300 g hexamethyldisiloxane (HMDS, the FTIR spectrum is shown in FIG. 1 (A)) was added to the flask with constant stirring, followed by the gradual addition of 210 g of an alkoxy functionalized organopolysilazane (PSZ) (having a molecular weight in the range of 160 g/mol to 200,000 g/mol). When the PSZ was completely dissolved, 30 g of 3-aminoopropyltrimethoxysilane (3AMP) was added slowly with constant stirring. Another vessel, B, equipped with a magnetic stirrer and inert gas inlet, was charged with 2.7 g of zirconium t-butoxide (ZTB) in 2.7 g dibutylether (DBE). The ZTB solution was stirred for 30 min. Similarly, another vessel, C, equipped with magnetic stirrer and inert gas inlet, was charged with 2.7 g of tantalum ethoxide (TAE) in 2.7 g DBE. The TAE solution was stirred for 30 min. Finally, in a fourth vessel, D, 10 g of glycodioxypropyltrimethoxysilane (GLYMO) was mixed with 90 g of t-butyl acetate. The solutions from vessel B and vessel C were added slowly to the solution from vessel A with constant stirring followed by the addition of the solution from vessel D. The stirring was continued for another 30 min, thereby forming a transparent liquid silicone-based composition according to the disclosure.

When the liquid silicone-based composition was deposited on a substrate under ambient conditions, the transparent solution dried to touch in 20 min, thereby forming a 10 micron silicone-based quasi-ceramic coating. An exemplary FTIR spectrum of the coating according to Example 1 is shown in FIG. 1 (B).

Thus, Example 1 shows the preparation of a liquid silicone-based coating composition and coating formed therefrom according to the disclosure, prepared according to the methods of the disclosure.

Example 2

To the liquid coating solution of Example 1, a 0.01-10.0 wt % solution of 1H,1H,2H,2H-Perfluorooctyltrimethoxysilane, or 1H,1H,2H,2H-Perfluorooctyltriethoxysilane, or 1H,1H,2H,2H-Perfluorodecyltrimethoxysilane, or 1H,1H, 2H,2H-Perfluorodecyltriethoxysilane or combination of these in 10 g of DBE or ethyl acetate or t-butyl acetate (TBAc) or HMDS was added, thereby forming a liquid silicone-based composition.

The liquid silicone-based compositions were deposited on substrates under ambient conditions and dried to touch in 20 minutes, thereby forming silicone-based quasi-ceramic coatings having fluorinated groups pendant to the silicon-based backbone matrix. The quasi-ceramic coatings had thicknesses in the range of 2 micron and 10 micron. The coatings prepared according to Example 2 demonstrated the ability to prevent the adhesion of any foreign material. The coatings prepared according to Example 2 demonstrated similar thermogravametric and nanomechanical properties as the coatings according to Example 1, described in Examples 6 and 7, below. An exemplary FTIR spectrum of the coating according to Example 2 is shown in FIG. 1 (C).

Thus, Example 2 shows the preparation of a liquid silicone-based coating composition and coating formed therefrom according to the disclosure, prepared according to the methods of the disclosure.

Example 3

0.001-10 wt. % of silverneodeconoate (SND) and 0.001 wt % of Silver Nitrate (AgN) was dissolved in 10 g of DBE or ethyl acetate or TBAc or HMDS. In another vessel, 0.001-90.0 wt. % Octadecyldimethyl (3-trimethoxy silylpropyl) ammonium chloride (ODSA), was dissolvent in methanol, ethanol, other higher alcohols, TBAc, DBE, or ethyl acetate. The above solutions of SND and ODSA were added to the solution from Example 1 or Example 2, thereby forming a liquid silicone-based composition.

The liquid silicone-based compositions were deposited on substrates under ambient conditions and dried to touch in 20 minutes, thereby forming silicone-based quasi-ceramic coatings having silver incorporated in the silicon-based backbone matrix and pendant groups comprising a charged quaternary ammonium cation. The quasi-ceramic coatings had a thickness in a range of 2 to 10 microns. The coatings prepared according to Example 3 demonstrated enhanced corrosion resistance and antimicrobial properties. An exemplary FTIR spectrum of the coating according to Example 3 is shown in FIG. 1 (D).

Thus, Example 3 shows the preparation of a liquid silicone-based coating composition and coating formed therefrom according to the disclosure, prepared according to the methods of the disclosure.

Example 4

In a vessel charged with inert gas, 0.01%-5.0 wt. % of titanium butoxide, tungsten ethoxide, and/or aluminum-tri-sec-butoxide, was added to HMDS, TBAc, DBE, and/or ethyl acetate. A 0.01 wt. %-99 wt. % of this solution was added to the solutions obtained from Example 1, Example 2, and Example 3, thereby forming a liquid silicone-based composition.

The liquid silicone-based compositions were deposited on substrates under ambient conditions and dried to touch in 20 minutes, thereby forming silicone-based quasi-ceramic coatings having titanium, tungsten, and/or aluminum incorporated in the silicon-based backbone matrix. The quasi-ceramic coatings had thicknesses in the range of 2 micron to 25 micron. The coatings prepared according to Example 4 demonstrated UV light protection and fire resistance.

Thus, Example 4 shows the preparation of a liquid silicone-based coating composition and coating formed therefrom according to the disclosure, prepared according to the methods of the disclosure.

Example 5

0.01 wt. %-10.0 wt. % of fused silica nanoparticles, aluminum oxide nanoparticles, silicon carbide nanoparticles, and/or silicon nitride nanoparticles were admixed in one or more of HMDS, TBAc, DBE, and ethyl acetate. Optionally, 0.1 to 1.0 wt. % of a surfactant (BYK 405, BYK 3560, BYK 3565, Disperbyk 2151, Disperbyk 2022, or Disperbyk 2055, supplied by BYK Additives and Instruments, or Tego® Wet KL 245 supplied by Tego) was added. The resulting suspension was mixed in ultrasonification bath for 30 min. 0.01 wt. %-99.0 wt. % of this was suspension was added to the solutions from Example 1, Example 2, Example 3 and Example 4, thereby forming liquid silicone-based coating compositions.

The liquid silicone-based compositions were deposited on substrates under ambient conditions and dried to touch in 20 minutes, thereby forming silicone-based quasi-ceramic coatings comprising inorganic fillers. The quasi-ceramic coatings had thicknesses in the range of 2 micron to 25 micron. The coatings prepared according to Example 5 demonstrated enhanced scratch resistance.

Thus, Example 5 shows the preparation of a liquid silicone-based coating composition and coating formed therefrom according to the disclosure, prepared according to the methods of the disclosure.

Example 6: Thermal Analysis of the Coating

Thermal analysis of the coating was performed on the dried, solid coating of Example 1. Three different heating rates (5, 10, 15° C./min) were adopted to check the stability of the solid. The solid was heated to 100° C., and approximately 2 wt. % of volatile components including solvent, and free and bound water evaporated. After all the volatile components had evaporated, the precursor transformed to a rigid solid mass and lost some weight during the subsequent heating steps as the temperature increased. In an inert condition (flowing nitrogen gas) at the heating rate of 10° C./min, the coating lost about 5 wt. % (of transformed solid) at 525° C. and retained approximately 90 wt. % of its solid content at 1200° C. Noticeably, no weight loss was observed after 800° C. heating.

The weight loss observed at 525° C. to 800° C. is due to the release of labile alkyl groups pendant to the backbone and rearrangement of chains of the silicone-based matrix to form a stable ceramic structure. Accordingly, thermogravimetric analysis demonstrate that there is no damage to the backbone structure on extended heating and the final structure is thermally stabile inorganic solid ceramic. Without intending to be bound by theory, it is believed that the high thermal stability is due to the formation of a silicon dioxide network which possesses high thermal stability. Further, without intending to be bound by theory, it is believed that the same weight loss and chain rearrangement shown to occur upon heating will also occur under ambient conditions over long periods of time (e.g., up to 2 years).

Thus, Example 6 demonstrates the stability of the coatings according to the disclosure prepared from the compositions of the disclosure according to the methods of the disclosure.

Example 7: Nanomechanical Properties of the Coating

The nanomechanical properties (i.e., nanoscale hardness and modulus) of the coating of Example 1 were evaluated using nanoindentation and nano-scratch experiments. These results are useful in evaluating the ability of the coating to withstand mechanical stresses. At-least six tests were performed to draw a good representation of coating property. The properties were evaluated using standard testing protocols known in the art that dictate the derivation of results before the appearance of substrate effect. In particular, ISO 14577 entitled "Metallic materials—Instrumental indentation test for hardness and materials parameters" was followed. The coating showed hardness value of 0.36 GPa, while the modulus was 4.30 GPa.

The loading and unloading curves of the coating of Example 1 were obtained and demonstrated the elastic recovery of the coatings with negligible plastic deformation. The loading and unloading curves also indicated that residual deformation was low in each case, suggesting that the coating is elastic. A close observation of loading/unloading curves and low standard deviation data suggests that the coating has smooth surface morphology. The scratch resistance of the coating was obtained. The original and residual surface morphology was plotted, along with penetration curve, as a function of scratch distance. The critical load to failure in the coating was 21 mN with a lateral force at critical load value of 7.63 mN, while, the coefficient of friction was 0.36. The elastic deformation recorded during the nanoscratch test was 97.8% while the remaining 2.2% was plastic deformation. The critical load and deformation values confirmed that coating can withstand higher service loadings without showing sign of wear.

Thus, Example 7 shows that the coatings of the disclosure are mechanically robust and able to withstand higher service loadings. Example 7 further shows that the coatings of the disclosure perform significantly better than current known silicone quasi-ceramic coatings.

The foregoing description is given for clearness of understanding only, and no unnecessary limitations should be understood therefrom, as modifications within the scope of the disclosure may be apparent to those having ordinary skill in the art.

Throughout this specification and claims which follow, unless the context requires otherwise, the word "comprise" and variations such as "comprises" and "comprising" will be understood to imply the inclusion of a stated integer, component, or step or groups of integers, components, or steps but not to the exclusion of any other integer, component, or step, or groups of integers, components, or steps.

Throughout the specification where compositions are described as including components or materials, it is contemplated that the composition can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

All patents, publications and references cited herein are hereby fully incorporated by reference. In case of conflict between the present disclosure and incorporated patents, publications and references, the present disclosure should control.

What is claimed:

1. A liquid silicone-based composition for forming a coating, the composition comprising:
   a silazane;
   an organometallic compound, wherein the organometallic compound comprises zirconium tert-butoxide, tantalum ethoxide, silver neodecanoate, titanium butoxide, tungsten ethoxide, aluminum-tri-sec-butoxide or combinations thereof;
   an alkoxysilane; and
   an aprotic solvent,
   wherein when applied to a substrate the liquid composition cures to form a quasi-ceramic coating under ambient conditions.

2. The composition of claim 1, wherein the silazane comprises an organopolysilazane.

3. The composition of claim 1, wherein the alkoxysilane comprises 3-aminopropyltrimethoxysilane, glycodioxypropyltrimethoxysilane, 1H,1H,2H,2H-perfluorooctyltriethoxysilane, 1H,1H,2H,2H-perfluorodecyltrimethoxysilane, 1H,1H,2H,2H-perfluorodecyltriethoxysilane, octadecyldimethyl (3-trimethoxy silylpropyl) ammonium chloride, N-(2-aminoethyl)3-aminopropyl-trimethoxysilane, N-(2-aminoethyl)3-aminopropyl-triethoxysilane, or combinations thereof.

4. The composition of claim 1, wherein the solvent comprises hexamethyldisiloxane, hexamethylcyclotrisiloxane, octamethyltrisiloxane, octamethylcyclotetrasiloxane, decamethyltetrasiloxane, decamethylcyclopentasiloxane, dodecamethylpentasiloxane, dodecamethylcyclohexasiloxane, tetradecamethylhexasiloxane, t-butyl acetate, n-butyl acetate, ethyl acetate, xylene, petroleum benzene, dipropylene glycol dimethyl ether, dipropylene glycol dibutyl ether, 1-methoxy-2-propyl acetate, 2-butoxyethyl acetate, 2-(2-butoxyethoxy) ethyl acetate, naphtha, dibutylether, or combinations thereof.

5. The composition of claim 1, wherein the silazane comprises organopolysilazane, the organometallic compound comprises zirconium tert-butoxide and tantalum ethoxide, the silane comprises glycodioxypropyltrimethoxysilane, and the solvent comprises hexamethyldisiloxane.

6. The composition of claim 1 further comprising an organic filler, an inorganic filler, a silsesquioxane, or combinations thereof.

7. A method of preparing the liquid silicone-based composition of claim 1, comprising:
admixing in the aprotic solvent, the silazane and the organometallic compound, thereby providing a first solution; and
admixing the first solution with the alkoxysilane, thereby providing the liquid silicone-based composition.

8. The method of claim 7, wherein the silazane comprises an organopolysilazane.

9. The method of claim 7, wherein the alkoxysilane comprises 3-aminopropyltrimethoxysilane, glycodioxypropyltrimethoxysilane, 1H,1H,2H,2H-perfluorooctyltriethoxysilane, 1H,1H,2H,2H-perfluorodecyltrimethoxysilane, 1H,1H,2H,2H-perfluorodecyltriethoxysilane, octadecyldimethyl (3-trimethoxy silylpropyl) ammonium chloride, N-(2-aminoethyl)3-aminopropyl-trimethoxysilane, N-(2-aminoethyl)3-aminopropyl-triethoxysilane, or combinations thereof.

10. The method of claim 7, wherein the solvent comprises hexamethyldisiloxane, hexamethylcyclotrisiloxane, octamethyltrisiloxane, octamethylcyclotetrasiloxane, decamethyltetrasiloxane, decamethylcyclopentasiloxane, dodecamethylpentasiloxane, dodecamethylcyclohexasiloxane, tetradecamethylhexasiloxane, t-butyl acetate, n-butyl acetate, ethyl acetate, xylene, petroleum benzene, dipropylene glycol dimethyl ether, dipropylene glycol dibutyl ether, 1-methoxy-2-propyl acetate, 2-butoxyethyl acetate, 2-(2-butoxyethoxy) ethyl acetate, naphtha, dibutylether, or combinations thereof.

11. The method of claim 7, wherein the silazane comprises organopolysilazane, the organometallic compound comprises zirconium tert-butoxide and tantalum ethoxide, the silane comprises glycodioxypropyltrimethoxysilane, and the solvent comprises hexamethyldisiloxane.

12. The method of claim 7, further comprising admixing with the liquid silicone-based composition a solution of a second alkoxysilane.

13. The method of claim 12, wherein the second alkoxysilane comprises 3-aminopropyltrimethoxysilane, glycodioxypropyltrimethoxysilane, 1H,1H,2H,2H-perfluorooctyltriethoxysilane, 1H,1H,2H,2H-perfluorodecyltrimethoxysilane, 1H,1H,2H,2H-perfluorodecyltriethoxysilane, octadecyldimethyl (3-trimethoxy silylpropyl) ammonium chloride, N-(2-aminoethyl)3-aminopropyl-trimethoxysilane, N-(2-aminoethyl)3-aminopropyl-triethoxysilane or combinations thereof.

14. The method of claim 7, further comprising admixing with the liquid silicone-based composition a second organometallic compound.

15. The method of claim 14, wherein the second organometallic compound comprises zirconium tert-butoxide, tantalum ethoxide, silver neodecanoate, titanium butoxide, tungsten ethoxide, aluminum-tri-sec-butoxide or combinations thereof.

16. The method of claim 7, further comprising admixing with the liquid silicone-based composition an organic filler, an inorganic filler, a silsesquioxane, or combinations thereof.

17. The method of claim 7, wherein the aprotic solvent comprises a mixture of two or more aprotic solvents.

18. The composition of claim 1, wherein the alkoxyxilane comprises one or more of a $C_1$-$C_{10}$ alkoxide, a $C_1$-$C_{30}$ alkyl, a $C_1$-$C_{30}$ fluoroalkyl, a $C_1$-$C_{30}$ alkyl amine, a $C_1$-$C_{30}$ dialkyl amine, a $C_1$-$C_{30}$ trialkyl amine, and a $C_1$-$C_{30}$ tetraalkyl ammonium.

19. A liquid silicone-based composition for forming a coating, the composition comprising:
a silazane;
an organometallic compound;
an alkoxysilane, wherein the alkoxysilane comprises 3-aminopropyltrimethoxysilane, glycodioxypropyltrimethoxysilane, 1H,1H,2H,2H-perfluorooctyltriethoxysilane, 1H,1H,2H,2H-perfluorodecyltrimethoxysilane, 1H,1H,2H,2H-perfluorodecyltriethoxysilane, octadecyldimethyl (3-trimethoxy silylpropyl) ammonium chloride, N-(2-aminoethyl)3-aminopropyl-trimethoxysilane, N-(2-aminoethyl)3-aminopropyl-triethoxysilane, or combinations thereof; and
an aprotic solvent,
wherein when applied to a substrate the liquid composition cures to form a quasi-ceramic coating under ambient conditions.

20. The composition of claim 19, wherein the organometallic compound comprises Zr, Ta, Ag, W, Al, Ti, Cu, Ce, La, or combinations thereof.

21. A method of preparing the liquid silicone-based composition of claim 19, comprising:
admixing in the aprotic solvent, the silazane and the organometallic compound, thereby providing a first solution; and
admixing the first solution with the alkoxysilane, thereby providing the liquid silicone-based composition.

22. The method of claim 21, wherein the organometallic compound comprises Zr, Ta, Ag, W, Al, Ti, Cu, Ce, La or combinations thereof.

23. A method of coating a substrate, comprising:
depositing on said substrate the liquid silicone-based coating composition of claim 1.

24. A method of coating a substrate, comprising depositing on said substrate the liquid silicone-based coating composition of claim 19.

* * * * *